United States Patent
Ponnapalli et al.

(10) Patent No.: US 10,250,504 B1
(45) Date of Patent: Apr. 2, 2019

(54) LONGEST PREFIX MATCHING OPERATIONS ON A VALUE IN MULTIPLE INTERSPERSED PREFIX LENGTH SEARCH SPACES TO DETERMINE AN OVERALL LONGEST PREFIX MATCHING RESULT IN A PACKET SWITCHING SYSTEM

(71) Applicant: Cisco Technology, Inc., San Jose, CA (US)

(72) Inventors: Venkata Naga Ramesh Ponnapalli, Sunnyvale, CA (US); Ayan Banerjee, Fremont, CA (US); Raghava K Sivaramu, Fremont, CA (US); Nataraj Bacthu, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/724,092

(22) Filed: Oct. 3, 2017

(51) Int. Cl.
*H04L 12/745* (2013.01)
*H04L 12/743* (2013.01)
*H04L 12/721* (2013.01)

(52) U.S. Cl.
CPC ............ *H04L 45/748* (2013.01); *H04L 45/72* (2013.01); *H04L 45/7457* (2013.01)

(58) Field of Classification Search
None
See application file for complete search history.

(56) References Cited

U.S. PATENT DOCUMENTS

| | | |
|---|---|---|
| 6,954,463 B1 | 10/2005 | Ma et al. |
| 9,742,673 B2 | 8/2017 | Banerjee et al. |
| 2004/0205229 A1 * | 10/2004 | Stojancic ............. G11C 7/1006 709/236 |
| 2005/0055339 A1 * | 3/2005 | Richardson ............. H04L 45/00 |
| 2008/0151863 A1 | 6/2008 | Lawrence et al. |
| 2014/0086248 A1 * | 3/2014 | Assarpour ............. H04L 45/748 370/392 |

(Continued)

OTHER PUBLICATIONS

Bando and Chao, "FlashTrie: Hash-based Prefix-Compressed Trie for IP Route Lookup Beyond 100Gbps," INFOCOM, 2010 Proceedings IEEE, Mar. 2010, IEEE, San Diego, CA (nine pages).

(Continued)

*Primary Examiner* — Mohammad S Adhami
(74) *Attorney, Agent, or Firm* — The Law Office of Kirk D. Williams (57) ABSTRACT

In one embodiment, longest prefix matching (LPM) operations are performed on a value in multiple interspersed prefix length search spaces to determine an overall longest prefix matching result in a packet switching system. A first LPM lookup unit performs a first LPM operation on the particular lookup value in a first search space finding a first longest matching prefix, and a second LPM lookup unit performs a second LPM operation on the particular lookup value in a second search space finding a second longest matching prefix. The longer of the first and second longest matching prefixes determines the overall LPM. In one embodiment, the first search space and the second search space include non-default route prefixes with interspersed prefix lengths matching a same value, such as, but not limited to the particular lookup value (e.g., a destination address of a packet).

20 Claims, 9 Drawing Sheets

(56) References Cited

U.S. PATENT DOCUMENTS

| | | | |
|---|---|---|---|
| 2014/0269723 A1* | 9/2014 | Wang | H04L 45/748 |
| | | | 370/392 |
| 2015/0124633 A1 | 5/2015 | Banerjee et al. | |
| 2015/0124806 A1 | 5/2015 | Banerjee et al. | |
| 2015/0295862 A1 | 10/2015 | Banerjee et al. | |
| 2016/0269290 A1* | 9/2016 | Chu | H04L 45/748 |

OTHER PUBLICATIONS

Dharmapurikar et al., "Longest Prefix Matching using Bloom Filters," SIGCOMM '03, Aug. 2003, ACM Karlsruhe, Germany (twelve pages).

Waldvogel et al, "Scalable High-Speed Prefix Matching," ACM Transactions on Computer Systems, vol. 19, No. 4, Nov. 2001, New York, NY (forty-one pages).

"Cisco Nexus 9500 Series Switches Architecture," White Paper, Cisco Systems, Inc., Nov. 2015, San Jose, CA (seventeen pages).

* cited by examiner

LONGEST PREFIX MATCHING OPERATIONS ON A VALUE IN MULTIPLE INTERSPERSED PREFIX LENGTH SEARCH SPACES TO DETERMINE AN OVERALL LONGEST PREFIX MATCHING RESULT IN A PACKET SWITCHING SYSTEM

TECHNICAL FIELD

The present disclosure relates packet switching systems and networks, and including, but not limited to, processing packets according to distributed longest prefix matching operations.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Longest prefix matching using ternary content-addressable memories and other data structure searching disciplines are particularly useful in performing lookup operations in determining how to process a packet in a network by a packet switching device.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with longest prefix matching operations on a value in multiple interspersed prefix length search spaces to determine an overall longest matching result in a packet switching system.

One embodiment includes a method in which a packet switching system determines an overall longest prefix matching (LPM) result for a particular lookup value associated with a packet using two or more LPM lookup units. In one embodiment, a first LPM lookup unit performs a first LPM operation on the particular lookup value in a first search space which determines a first longest matching prefix and results in an identification of a first LPM result including processing information identified directly or indirectly and a first length value specifying a prefix length of the first longest matching prefix, which is not a default route. A second LPM lookup unit performs a second LPM operation on the particular lookup value in a second search space which determines a second longest matching prefix and results in an identification of a second LPM result including processing information identified directly or indirectly and a second length value specifying a prefix length of the second longest matching prefix, which is not a default route. The packet switching system selects as the overall LPM result the first LPM result when the first length value is greater than the second length value else the second LPM result, which includes comparing the first and second length values; and the packet is processed according to the overall LPM result. In one embodiment, the first search space and the second search space include non-default route prefixes with interspersed prefix lengths matching a same value.

In one embodiment, the first search space and the second search space include prefixes with interspersed prefix lengths for the particular lookup value. In one embodiment, the first and second LPM operations are said performed sequentially. In one embodiment, the first and second LPM operations are performed on different cards, boards, or modules of the packet switching system.

In one embodiment, the packet switching system includes multiple distribution stage modules communicatively coupled with multiple routing stage modules, with said performing the first LPM operation being performed on a particular distribution stage module of the plurality of distribution stage modules, and each of the operations of said performing the second LPM operation and said selecting as the overall LPM result is performed on a particular routing stage module of the plurality of routing stage modules. One embodiment includes the additional limitations of: receiving the packet by the particular distribution stage module; and forwarding the packet from the particular distribution stage module with the first LPM result to the particular routing stage module, with said processing the packet including forwarding the packet to one of the plurality of distribution stage modules corresponding to the overall LPM result. In one embodiment, the packet when said forwarded from the particular distribution stage module to the particular routing stage module includes the first LPM result in metadata or an internal header associated with the packet.

In one embodiment, the first LPM result is selected as the overall LPM result. In one embodiment, the second LPM result is selected as the overall LPM result. In one embodiment, the first and second LPM operations are performed at least partially overlapping in time.

2. Description

Disclosed are, inter alia, methods, apparatus, computer-storage media, mechanisms, and means associated with longest prefix matching operations on a value in two or more interspersed prefix length search spaces to determine an overall longest matching result in a packet switching system.

As used herein, "interspersed prefix lengths" refers prefixes of varying lengths that can be individually stored in any of multiple (non-full) search spaces as there is not a required ordering among the search spaces for storing prefixes of varying lengths. However, there may be a required ordering or orderings within one or more of these search spaces depending on the LPM discipline (e.g., a ternary content-addressable memory requires a longest to shortest ordering for prefixes that match a lookup word).

Performing individual LPM operations in each of these two or more search spaces for a same lookup value, and then selecting as the overall LPM matching result the one corresponding to the longer or longest of matched prefix of these individual LPM operations allows prefixes to be added to any of the multiple (non-full) search spaces, which improves scalability. Such an approach is counter-intuitive, as this approach requires searching of all search spaces for every lookup value, wherein providing an ordering among search spaces can produce a result faster or with less resources by searching the search spaces in order until a match is determined, such that the remaining unsearched spaces do not need to be searched.

As used herein, a "default route" refers to a wildcard prefix (e.g., *.*.*.* for an Internet Protocol Version 4 address) that matches any route. The term "route" is used to refer to a fully or partially expanded prefix (e.g., 10.0.0.1 or 10.0.*.*), with a routing being different than a "path" through the network which refers to a nexthop (e.g., next router) or other path specification (e.g., traverse router A then router B, and so on). Also, the use of the term "prefix" (unless qualified) herein refers to a fully or partially expanded prefix.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Figure 1A:
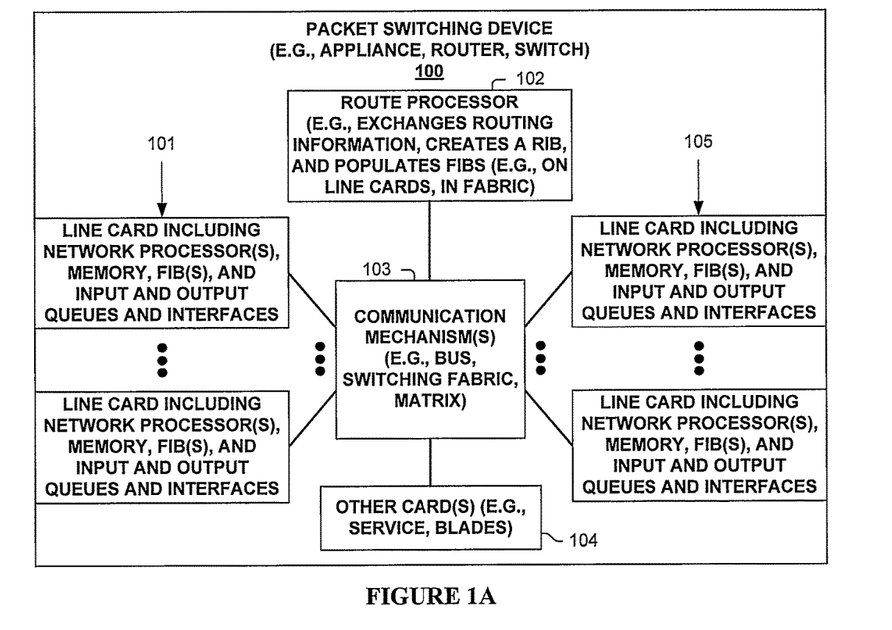
FIG. 1A illustrates a packet switching device according to one embodiment.
Figure 1B:
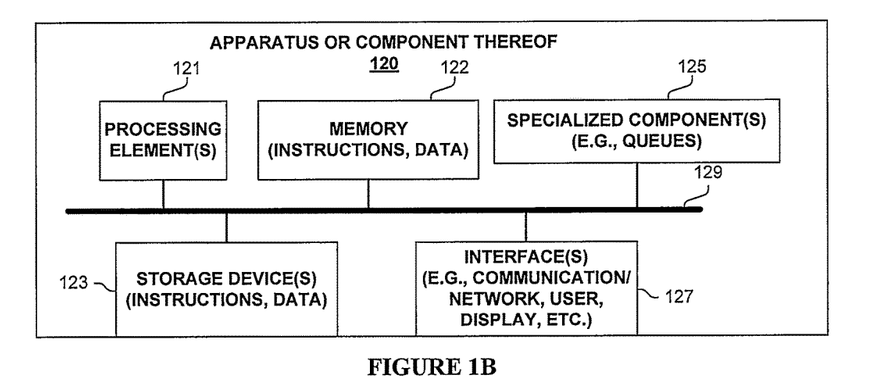
FIG. 1B illustrates an apparatus according to one embodiment.

FIGS. 1A-B and their discussion herein are intended to provide a description of various exemplary packet switching systems used in forwarding packets according to an overall longest prefix matching operation in one embodiment.

One embodiment of a packet switching device 100 is illustrated in FIG. 1A. As shown, packet switching device 100 includes multiple line cards 101 and 105, each with one or more network interfaces for sending and receiving packets over communications links (e.g., possibly part of a link aggregation group), and with one or more network processors that are used in one embodiment associated with longest prefix matching operations on a value in multiple interspersed prefix length search spaces (e.g., forwarding information bases) to determine an overall longest matching result in a packet switching system. Packet switching device 100 also has a control plane with one or more processing elements 102 for managing the control plane and/or control plane processing of packets associated with longest prefix matching operations on a value in multiple interspersed prefix length search spaces to determine an overall longest matching result in a packet switching system. Packet switching device 100 also includes other cards 104 (e.g., service cards, blades) which include processing elements that are used in one embodiment to process (e.g., forward, drop, manipulate) packets associated with longest prefix matching operations on a value in multiple interspersed prefix length search spaces to determine an overall longest matching result in a packet switching system, and some communication mechanism 103 (e.g., bus, switching fabric, and/or matrix, etc.) for allowing its different entities 101, 102, 104 and 105 to communicate.

Line cards 101 and 105 typically perform the actions of being both an ingress and egress line card, in regards to multiple other particular packets and/or packet streams being received by, or sent from, packet switching device 100. In one embodiment, line cards 101 and 105 include a distribution switch element and/or egress switch element. In one embodiment, switching fabric 103 includes a distribution switch element and/or routing switch element.

FIG. 1B is a block diagram of an apparatus 120 used in one embodiment associated with longest prefix matching operations on a value in multiple interspersed prefix length search spaces to determine an overall longest matching result in a packet switching system. In one embodiment, apparatus 120 performs one or more processes, or portions thereof, corresponding to one of the flow diagrams illustrated or otherwise described herein, and/or illustrated in another diagram or otherwise described herein.

In one embodiment, apparatus 120 includes one or more processor(s) 121 (typically with on-chip memory), memory 122, storage device(s) 123, specialized component(s) 125 (e.g. optimized hardware such as for performing longest prefix matching and/or packet processing operations, etc.), and interface(s) 127 for communicating information (e.g., sending and receiving packets, user-interfaces, displaying information, etc.), which are typically communicatively coupled via one or more communications mechanisms 129 (e.g., bus, links, switching fabric, matrix), with the communications paths typically tailored to meet the needs of a particular application.

Various embodiments of apparatus 120 may include more or fewer elements. The operation of apparatus 120 is typically controlled by processor(s) 121 using memory 122 and storage device(s) 123 to perform one or more tasks or processes. Memory 122 is one type of computer-readable/computer-storage medium, and typically comprises random access memory (RAM), read only memory (ROM), flash memory, integrated circuits, and/or other memory components. Memory 122 typically stores computer-executable instructions to be executed by processor(s) 121 and/or data which is manipulated by processor(s) 121 for implementing functionality in accordance with an embodiment. Storage device(s) 123 are another type of computer-readable medium, and typically comprise solid state storage media, disk drives, diskettes, networked services, tape drives, and other storage devices. Storage device(s) 123 typically store computer-executable instructions to be executed by processor(s) 121 and/or data which is manipulated by processor(s) 121 for implementing functionality in accordance with an embodiment.

Figure 2A:
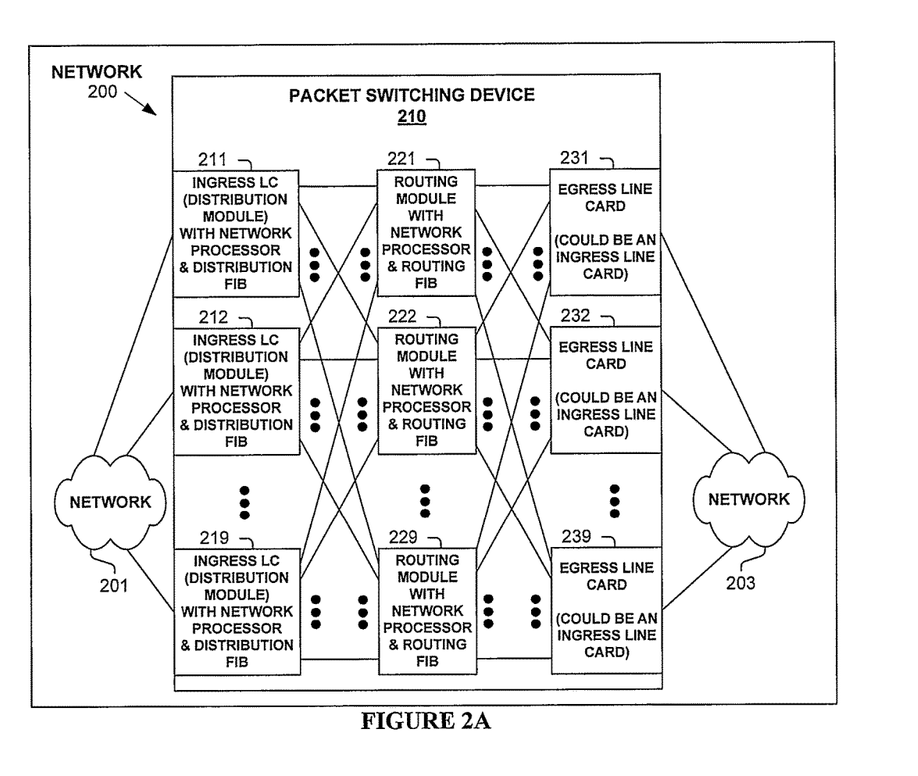
FIG. 2A illustrates a packet switching device according to one embodiment.
Figure 2B:
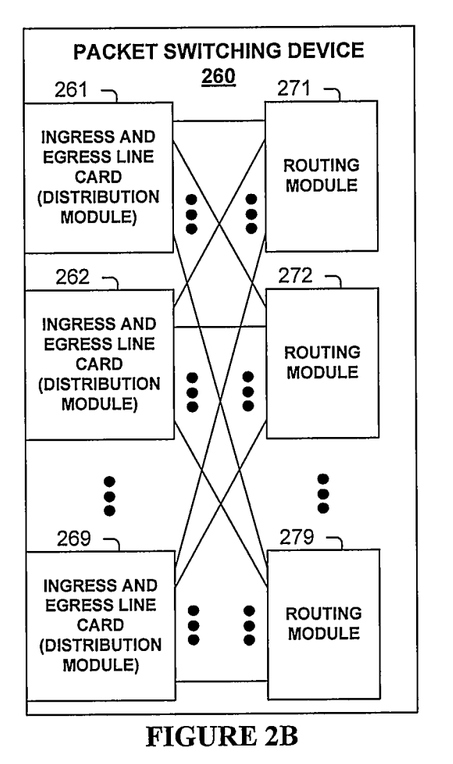
FIG. 2B illustrates a packet switching device according to one embodiment.
Figure 2C:
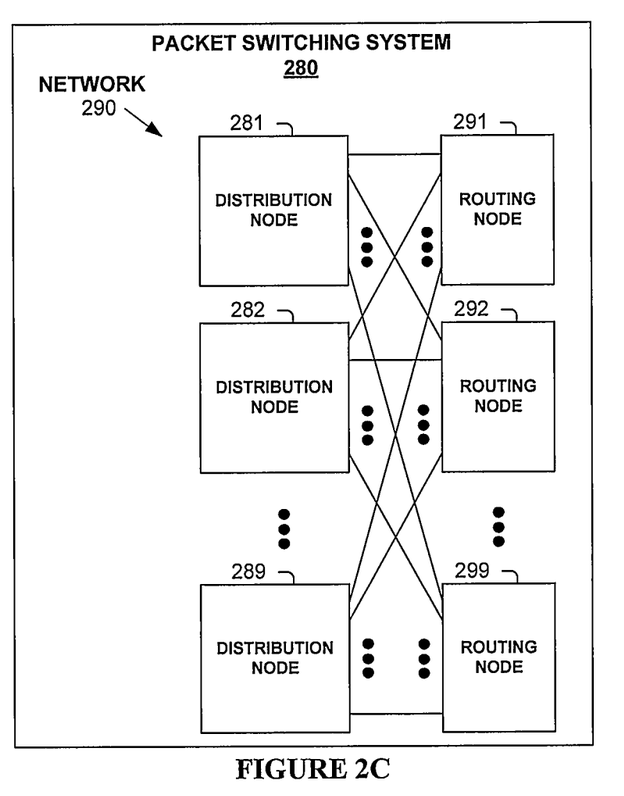
FIG. 2C illustrates a packet switching system according to one embodiment.

FIGS. 2A-C and their discussion herein are intended to provide a description of various exemplary packet switching systems and/or devices used in forwarding packets according to an overall longest prefix matching operation in one embodiment.

FIG. 2A illustrates a network 200 including networks 201 and 203 (often the same network) communicatively coupled to packet switch device 210. In one embodiment, packet switching device 210 includes multiple ingress line cards 211-219 (also referred to as distribution modules 211-219), multiple routing modules 221-229, and egress line cards 231-239. In one embodiment, each of egress line cards 231-239 corresponds to an ingress line card 211-219. In one embodiment, packet switching device 210 is implemented in a single chassis.

In one embodiment of packet switching device 210, the determination of an overall longest prefix matching result is a two-stage operation on a same value (e.g., destination address of a packet) by performing a first longest prefix matching operation in a line card 211-219 and a second longest prefix matching operation in a routing module 221-229. The overall longest prefix matched is then the longer of the determined first and second longest matching prefixes. In one embodiment, the determination of an overall longest prefix matching result is an n-stage operation (e.g., n sequential stage operations), with longest prefix matching operations performed on n different search spaces (with n being an integer greater than one), with the longest prefix matched thereby being the overall longest matching prefix.

In one embodiment, each of line cards (distribution modules) 211-219 includes a network processor and possibly specialized longest prefix matching hardware (e.g., ternary content-addressable memory or memories), and a distribution forwarding information base (FIB) (e.g., distribution search space). In one embodiment, each of routing modules 221-229 includes a network processor and possibly specialized longest prefix matching hardware (e.g., ternary content-addressable memory or memories), and a routing forwarding information base (FIB) (e.g., distribution search space).

In one embodiment, packet switching device 210 includes a switching fabric that performs the longest matching performing the determination of an overall longest prefix matching result in a two-stage operation on a same value (e.g., destination address of a packet). In one embodiment of packet switching device 210, line cards are not shown, and modules 211-219 correspond to distribution switch elements of the switching fabric, modules 221-229 correspond to routing switch elements of the switching fabric, and modules 231-239 correspond to egress switch elements of the switch fabric. One embodiment of the switch fabric does not include egress switch elements.

FIG. 2B illustrates a packet switching device 260 performing the determination of an overall longest prefix matching result in a two-stage operation on a same value (e.g., destination address of a packet) by performing a first longest prefix matching operation in a line card 261-269 and a second longest prefix matching operation in a routing module 271-279. The overall longest prefix matched is then the longer of the determined first and second longest matching prefixes. In one embodiment, each of line cards (distribution modules) 261-269 includes a network processor and possibly specialized longest prefix matching hardware (e.g., ternary content-addressable memory or memories), and a distribution forwarding information base (FIB) (e.g., distribution search space). In one embodiment, each of routing modules 271-279 includes a network processor and possibly specialized longest prefix matching hardware (e.g., ternary content-addressable memory or memories), and a routing forwarding information base (FIB) (e.g., distribution search space). In one embodiment, packet switching device 260 is implemented in a single chassis. In one embodiment, packet switching device 260 is a Cisco Nexus 9500 Series Switch.

FIG. 2C illustrates a packet switching system 280 of one embodiment implemented in a network 290 that includes multiple standalone network nodes 281-299 communicatively coupled, such as, but not limited to, in a Clos topology. In one embodiment, packet switching system 280 performs the determination of an overall longest prefix matching result in a two-stage operation on a same value (e.g., destination address of a packet) by performing a first longest prefix matching operation in a distribution network node 281-289 and a second longest prefix matching operation in a routing network node 291-299. The overall longest prefix matched is then the longer of the determined first and second longest matching prefixes. In one embodiment, each of distribution network nodes 281-289 includes a network processor and possibly specialized longest prefix matching hardware (e.g., ternary content-addressable memory or memories), and a distribution forwarding information base (FIB) (e.g., distribution search space). In one embodiment, each of routing network nodes 291-299 includes a network processor and possibly specialized longest prefix matching hardware (e.g., ternary content-addressable memory or memories), and a routing forwarding information base (FIB) (e.g., distribution search space).

Figure 3A:
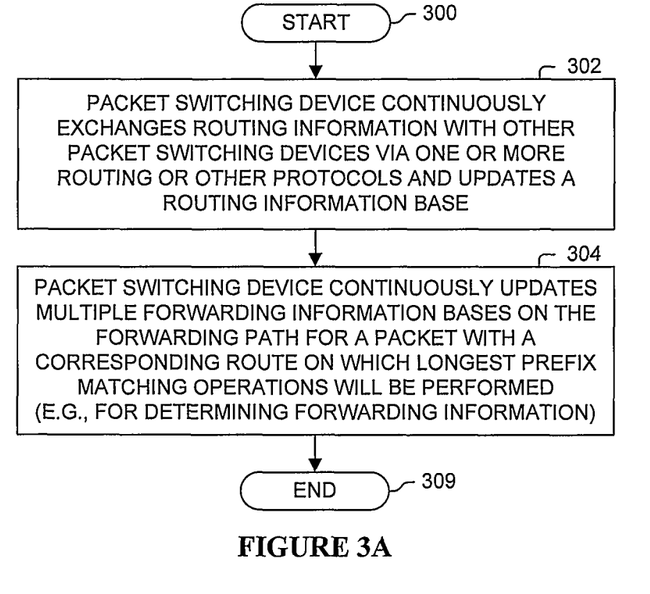
FIG. 3A illustrates a process according to one embodiment.

FIG. 3A illustrates a process performed in one embodiment. Processing begins with process block 300. In process block 302, a packet switching device (or system) continuously exchanges routing information with other packet switching devices (or systems) via one or more routing or other protocols and updates a routing information base.

In process block 304, based on changes to the routing information base, the packet switching device continuously updates multiple forwarding information bases (e.g., first and second search spaces) on the forwarding path for a packet through the packet switching device with corresponding routes (and processing/adjacency information) on which longest prefix matching operations will be performed based on a longer matching prefix determined from multiple prefix matching operations.

Processing of the flow diagram of FIG. 3A is complete as indicated by process block 309.

Splitting the overall longest prefix matching operation among multiple hardware cards, boards, modules, network processors, ternary content-addressable memories, integrated circuits, chips, etc., and performing longest prefix matching operations on different portions of the overall search space provides improved operation and scalability by, inter alia, increasing the size of the overall search space (e.g., multiple search spaces instead of a single search space).

One embodiment herein improves the operation of a packet switching device (or system) or other device (or system) by allowing different search spaces to include non-default route prefixes with interspersed prefix lengths matching a same value.

Figure 3B:
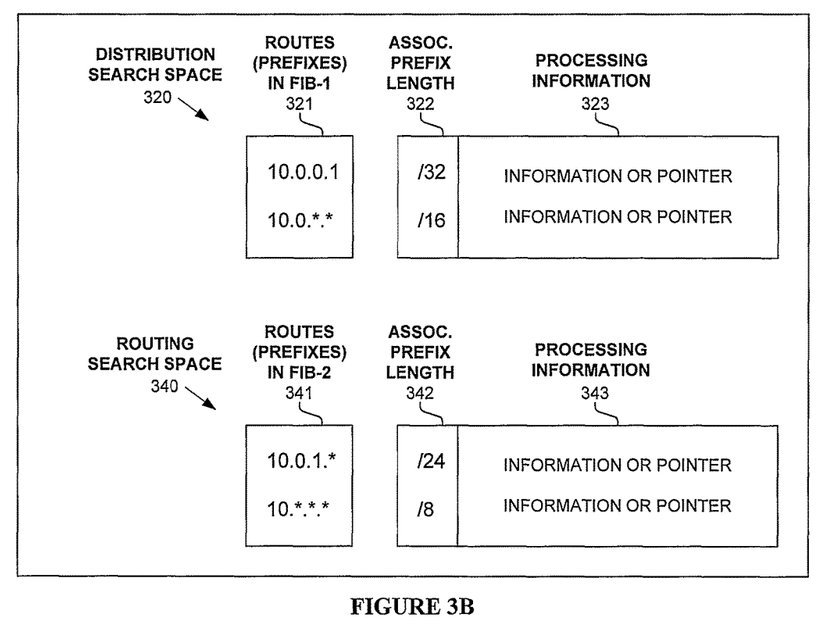
FIG. 3B illustrates multiple search spaces with interspersed prefix lengths according to one embodiment.

FIG. 3B illustrates such multiple search spaces with interspersed prefix lengths according to one embodiment. Shown are two search spaces 320 and 340 combining to be the overall search space. In one embodiment, there are more than two search spaces combining to be the overall search space. In one embodiment, non-default routes are prevented from being in both search spaces 320 and 340. In one embodiment, non-default routes can be programmed in both search spaces 320 and 340, which may be advantageous for, inter alia, moving prefixes among search spaces, such as, but not limited to, freeing up space in one search space 320 or 340, balancing search spaces 320 and 340, etc. In one embodiment, a same prefix is not allowed in both search spaces 320 and 340.

Also shown in FIG. 3B are prefix lengths 322 and direct or indirect processing information 323 associated with each of routes 321, and prefix lengths 342 and processing information 343 associated with each of routes 341.

In one embodiment, first and second search spaces store prefixes with interspersed prefix lengths, with the first search space including a particular prefix, and with the second search space including both (1) a first prefix with a length greater than the length of the particular prefix, and (2) a second prefix with a length less than the length of the particular prefix, with all three of the particular prefix, the first prefix and the second prefix matching a particular lookup value.

As shown in FIG. 3B, each of search spaces 320 and 340 includes two routes (321, 341) that will match a value (e.g., the value/destination address of 10.0.0.1) as well as other routes (not shown). Further, these search spaces 320 and 340 include non-default routes (prefixes) 321, 341 with interspersed prefix lengths matching a same value as search space 320 includes these matching routes 321 of prefix length /32 and /16, while routing search space 340 includes these matching routes 341 of prefix length /24 and /8.

Figure 3C:
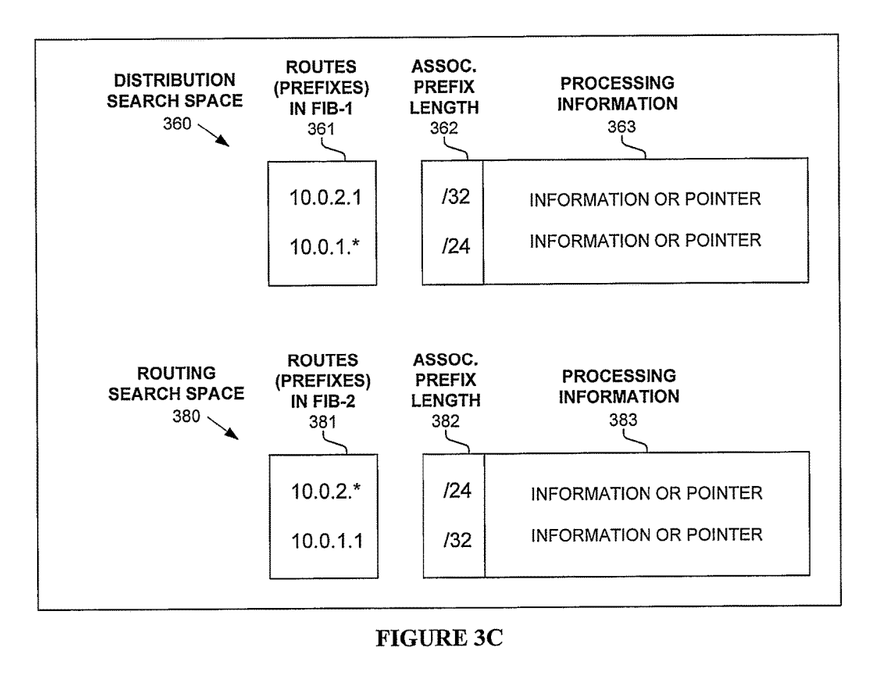
FIG. 3C illustrates multiple search spaces with interspersed prefix lengths according to one embodiment.

FIG. 3C illustrates such multiple search spaces with interspersed prefix lengths according to one embodiment. Shown are two search spaces 360 and 380 combining to be the overall search space. In one embodiment, there are more than two search spaces combining to be the overall search space. In one embodiment, non-default routes are prevented from being in both search spaces 360 and 380. In one embodiment, non-default routes can be programmed in both search spaces 360 and 380, which may be advantageous for, inter alia, moving prefixes among search spaces, such as, but not limited to, freeing up space in one search space 360 or 380, balancing search spaces 360 and 380, etc. In one embodiment, a same prefix is not allowed in both search spaces 360 and 380.

Also shown in FIG. 3C are prefix lengths 362 and direct or indirect processing information 363 associated with each of routes 361, and prefix lengths 382 and processing information 383 associated with each of routes 381.

In one embodiment, first and second search spaces store prefixes with interspersed prefix lengths, with the first search space including a first particular prefix and a first specific prefix and the second search space including a second particular prefix and a second specific prefix. The first particular prefix is longer than the first specific prefix with both matching a first lookup value, and the second particular prefix is shorter than the first specific prefix with both matching a second lookup value.

As shown in FIG. 3C, each of search spaces 360 and 380 includes a route that will match a lookup value of 10.0.1.1, and each of search spaces 360 and 380 includes a route that will match a lookup value of 10.0.2.1 as well as other routes (not shown). Further, these search spaces 360, 380 include non-default route prefixes with interspersed prefix lengths. For a lookup value of 10.0.2.1, search space 360 includes matching route 10.0.2.1 of prefix length /32 and search space 380 includes matching route 10.0.2.* of prefix length /24. For a different lookup value of 10.0.1.1, search space 360 includes matching route 10.0.1.* of prefix length /24 and search space 380 includes matching route 10.0.2.1 of prefix length /32.

Figure 4:
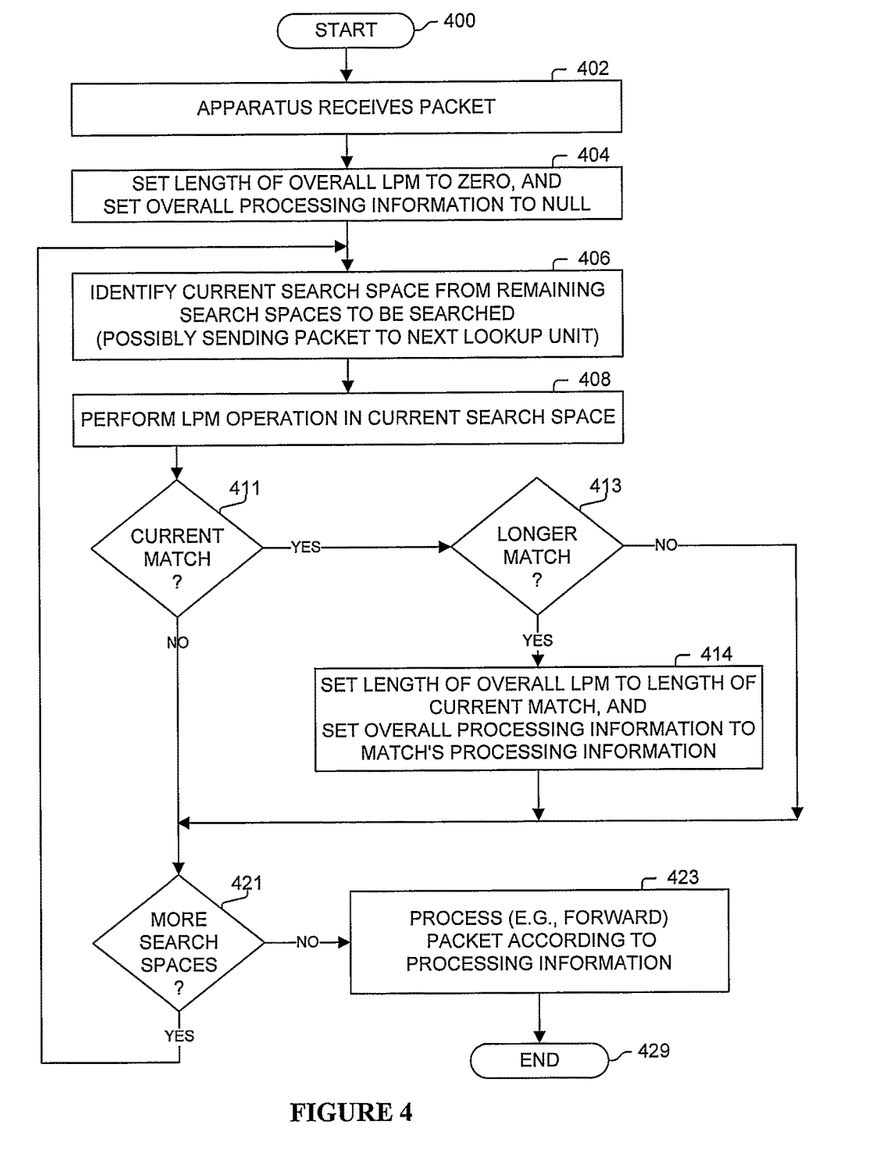
FIG. 4 illustrates a process according to one embodiment.

FIG. 4 illustrates a process performed in one embodiment. Processing begins with process block 400. In process block 402, a packet is received by the apparatus (e.g., packet switching device or system). In process block 404, two variables are initialized including setting the length of the overall LPM to zero, and overall processing information (pointer or actual forwarding information) to null. In process block 406, a current search space is identified from the remaining search spaces to search. In one embodiment, the current search space is determined by the location of the packet as it is forwarded through the apparatus (e.g., search spaces stored on different cards, boards, modules, devices).

In process block 408, the longest prefix matching operation is performed (e.g., on the destination address of the packet, possibly in a virtual routing and forwarding/VRF context). If a match is found in the current search space (as determined in process block 411) and it is a longer match than previously found (as determined in process block 413 by comparing the length of the current match with the length of the overall LPM), then in process block 414 the length of the current match is set to the length of the current match and the overall processing information is set to the processing information associated with the current match.

Processing continues with process block 421, and as determined therein if there are more search spaces to search, processing returns to process block 406; otherwise, processing proceeds to process block 423 wherein the packet is processed (e.g., forwarded) according to the overall processing information (possibly dropping the packet if null). Processing of the flow diagram of FIG. 4 is complete as indicated by process block 429.

Figure 5:
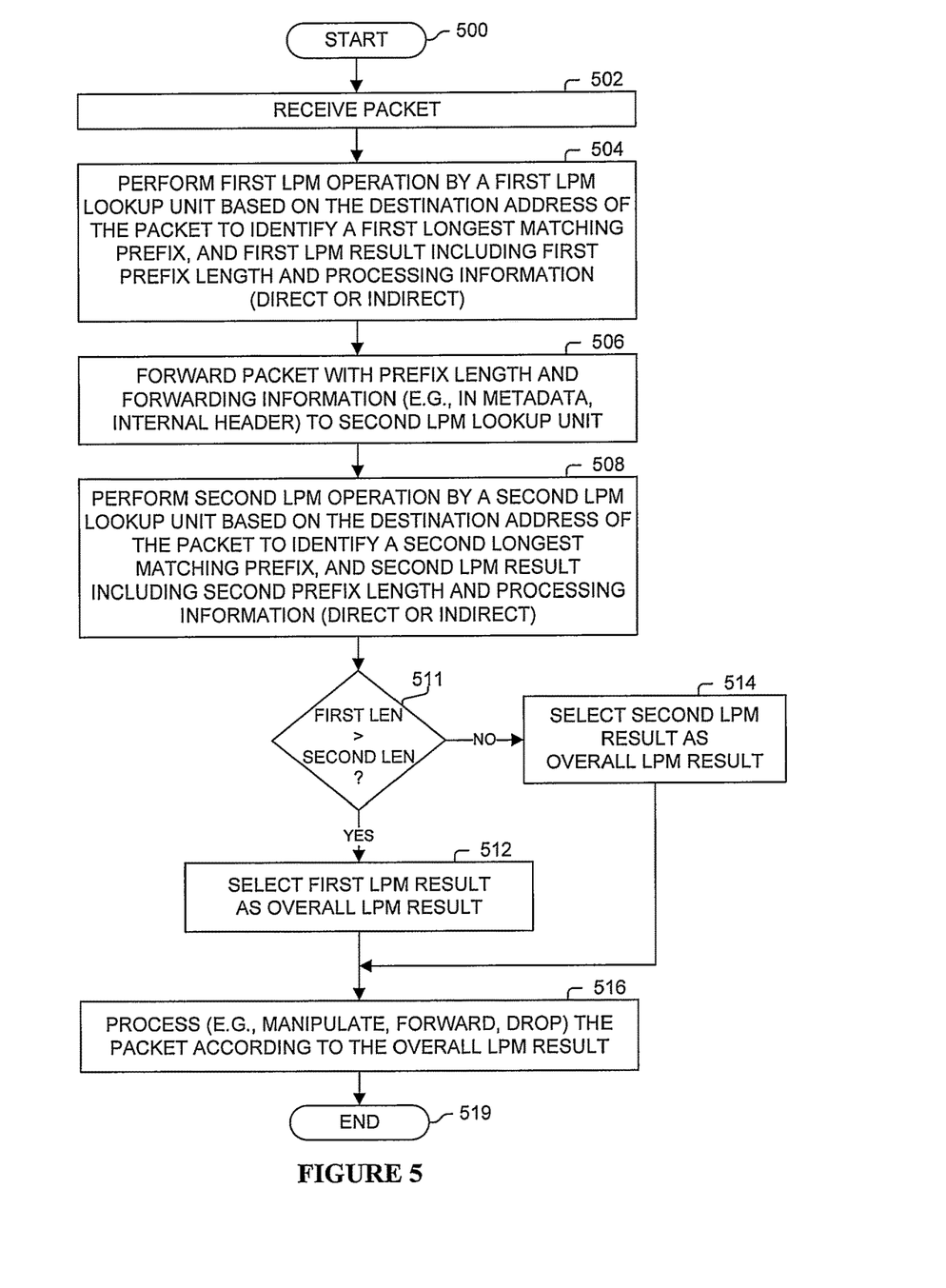
FIG. 5 illustrates a process according to one embodiment.

FIG. 5 illustrates a process performed in one embodiment. The process of FIG. 5 refers specifically to two different LPM lookup units for description purposes. In one embodiment, the apparatus performs a lookup operation in only these two LPM lookup units for a packet. In one embodiment, these two LPM lookup units are less than all of the LPM lookup units in which a LPM lookup operation is performed for a packet.

Processing begins with process block 500. In process block 502, a packet is received by the packet switching device (or system). In process block 504, a first LPM operation is performed by a first LPM lookup unit based on the destination address of the packet to identify a first longest matching prefix, and first LPM result including first prefix length and forwarding information (direct or indirect). In process block 506, the packet with prefix length and processing information (e.g., in metadata, internal header) is forwarded to a second LPM lookup unit. In process block 508, a second LPM operation is performed by a second LPM lookup unit based on the destination address of the packet to identify a second longest matching prefix, and second LPM result including second prefix length and processing information (direct or indirect).

As determined in process block 511, if the first (matched) prefix length is greater than the second (matched) prefix length, then processing proceeds to process block 512, else processing proceeds to process block 514. In process block 514, the second LPM result is selected as the overall LPM result, and processing proceeds to process block 516. In process block 512, the first LPM result is selected as the overall LPM result, and processing proceeds to process block 516. In process block 516, the packet is processed (e.g., manipulated, forwarded, dropped) according to the overall LPM result. Processing of the flow diagram of FIG. 5 is complete as indicated by process block 519.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
   determining, by a packet switching system, an overall longest prefix matching (LPM) result for a particular lookup value associated with a packet, wherein said determining the LPM result includes:
   performing a first LPM operation, by a first LPM lookup unit, on the particular lookup value in a first search space determining a first longest matching prefix and resulting in an identification of a first LPM result including processing information identified directly or indirectly and a first length value specifying a prefix length of the first longest matching prefix, which is not a default route;
   performing a second LPM operation, by a second LPM lookup unit, on the particular lookup value in a second search space determining a second longest matching prefix and resulting in an identification of a second LPM result including processing information identified directly or indirectly and a second length value specifying a prefix length of the second longest matching prefix, which is not a default route;
   selecting as the overall LPM result the first LPM result when the first length value is greater than the second length value else the second LPM result, which includes comparing the first and second length values; and
   processing the packet according to the overall LPM result;
   wherein the first search space and the second search space include non-default route prefixes with interspersed prefix lengths matching a same value.

2. The method of claim 1, wherein the first search space and the second search space include prefixes with interspersed prefix lengths for the particular lookup value.

3. The method of claim 2, wherein the first and second LPM operations are said performed sequentially.

4. The method of claim 3, wherein the first and second LPM operations are performed on different cards or boards of the packet switching system.

5. The method of claim 4, wherein the packet switching system includes a plurality of distribution stage modules communicatively coupled with a plurality of routing stage modules;
   wherein said performing the first LPM operation is performed on a particular distribution stage module of the plurality of distribution stage modules, and with each of said operations of performing the second LPM operation and said selecting as the overall LPM result being performed on a particular routing stage module of the plurality of routing stage modules;
   wherein the method includes the additional limitations of: receiving the packet by the particular distribution stage module; and forwarding the packet from the particular distribution stage module with the first LPM result to the particular routing stage module; and
   wherein said processing the packet includes forwarding the packet to one of the plurality of distribution stage modules corresponding to the overall LPM result.

6. The method of claim 5, wherein the packet, when said forwarded from the particular distribution stage module to the particular routing stage module, includes the first LPM result in metadata or an internal header associated with the packet.

7. The method of claim 5, wherein said selecting as the overall LPM result selects the first LPM result.

8. The method of claim 5, wherein said selecting as the overall LPM result selects the second LPM result.

9. The method of claim 1, wherein the first and second LPM operations are said performed sequentially.

10. The method of claim 9, wherein the first and second LPM operations are performed on different cards, boards, or modules of the packet switching system.

11. The method of claim 10, wherein the packet switching system includes a plurality of distribution stage modules communicatively coupled with a plurality of routing stage modules; wherein said performing the first LPM operation is performed on a particular distribution stage module of the plurality of distribution stage modules; and wherein each of said performing the second LPM operation said selecting as the overall LPM result is performed on a particular routing stage module of the plurality of routing stage modules.

12. The method of claim 11, wherein said selecting as the overall LPM result selects the first LPM result.

13. The method of claim 11, wherein said selecting as the overall LPM result selects the second LPM result.

14. The method of claim 1, wherein the first and second LPM operations are said performed at least partially overlapping in time.

15. An apparatus, comprising:
a packet switching device including:
a plurality of line cards with each of the plurality of line cards including: a plurality of external physical interfaces that communicate packets external to the packet switching device, and a plurality of internal physical interfaces;
a plurality of routing stage modules, with each of the plurality of routing stage modules including a plurality of fabric module physical interfaces; and
a plurality of links communicatively coupling the plurality of internal physical interfaces with the plurality of fabric module physical interfaces;
wherein each of the plurality of line cards includes a line card network processor that performs a first longest prefix matching (LPM) operation based on a destination address of an externally-received packet, received on one of the plurality of external physical interfaces, in a distribution stage search space to determine a first longest matching prefix and corresponding first LPM result including a first length value specifying a prefix length of the first longest matching prefix, with the externally-received packet and said first LPM result being distributed to a routing stage module of the plurality of routing stage modules; and
wherein each of the routing stage modules includes a routing stage network processor that performs a second LPM operation on a destination address of a distributed packet associated with a particular first LPM result in a routing stage search space to determine a second longest matching prefix and corresponding second LPM result including a second length value specifying a prefix length of the second longest matching prefix, that selects as an overall LPM result the first LPM result when the first length value is greater than the second length value else the second LPM result, that forwards the distributed packet to a particular line card of the particular line cards identified based on the overall LPM result; and
wherein the distribution stage search space and the routing stage search space include non-default route prefixes with interspersed prefix lengths matching a same destination address of a packet.

16. The apparatus of claim 15, wherein said routing stage search space on each of the plurality of routing stage modules is the same.

17. The apparatus of claim 16, wherein said distribution stage search space on each of the plurality of line cards is the same.

18. A method, comprising:
performing operations by a packet switching device including: a plurality of line cards, a plurality of routing stage modules, and a plurality of links communicatively coupling the plurality of line cards with the plurality of routing stage modules; wherein said operations include:
receiving a particular packet on an external interface of a particular line card of the plurality of line cards;
performing, by the particular line card, a first longest prefix matching (LPM) operation based on a destination address of the particular packet in a distribution stage search space to determine a first longest matching prefix and corresponding first LPM result including a first length value specifying a prefix length of the first longest matching prefix, with the particular packet and said first LPM result being distributed to a particular routing stage module of the plurality of routing stage modules;
performing, by the particular routing stage module despite the first LPM result associated with information for forwarding the particular packet but to determine if a routing stage search space includes a longer matching prefix, a second LPM operation based on the destination address of the particular packet in the routing stage search space to determine a second longest matching prefix and corresponding second LPM result including a second length value specifying a prefix length of the second longest matching prefix;
selecting, by the particular routing stage module, as an overall LPM result the first LPM result when the first length value is greater than the second length value else the second LPM result; and
forwarding the particular packet from the particular routing stage module to an identifiable line card of the plurality of line cards corresponding to the overall LPM result;
wherein the distribution stage search space and the routing stage search space include non-default route prefixes with interspersed prefix lengths matching the destination address of the particular packet.

19. The method of 18, wherein said operations further include: receiving via a routing protocol an advertisement of the first longest matching prefix and an advertisement of the second longest matching prefix; programming the first longest matching prefix in the distribution stage search space; and programming the second longest matching prefix in the routing stage search space.

20. The method of 18, wherein the first LPM result is said selected as the overall LPM result.

* * * * *